(12) United States Patent
Fulton

(10) Patent No.: US 7,592,041 B2
(45) Date of Patent: Sep. 22, 2009

(54) SIMULATED TURF AND METHOD OF MAKING SAME

(75) Inventor: C. Dwayne Fulton, Osage Beach, MO (US)

(73) Assignee: Osment Models, Inc., Linn Creek, MO (US)

( * ) Notice: Subject to any disclaimer, the term of this patent is extended or adjusted under 35 U.S.C. 154(b) by 171 days.

(21) Appl. No.: 11/244,520

(22) Filed: Oct. 6, 2005

(65) Prior Publication Data

US 2007/0082171 A1     Apr. 12, 2007

(51) Int. Cl.
*B05D 5/00*     (2006.01)
*B05D 1/16*     (2006.01)
*B05D 3/12*     (2006.01)
*B29C 53/00*    (2006.01)
*B29C 51/00*    (2006.01)

(52) U.S. Cl. .................. 427/198; 427/197; 427/180; 427/200; 264/480; 264/139; 264/239; 264/299; 264/319

(58) Field of Classification Search .................. 428/17, 428/15, 27, 90, 141, 143, 147; 427/198, 427/200, 203, 206, 201, 180, 197; 264/479, 264/480, 138, 139, 239, 291, 292, 299, 319, 264/31

See application file for complete search history.

(56) References Cited

U.S. PATENT DOCUMENTS

| 2,185,924 | A |   | 1/1940 | Pereira |         |
|-----------|---|---|--------|---------|---------|
| 2,196,230 | A | * | 4/1940 | Randel  | 428/13  |
| 2,748,516 | A | * | 6/1956 | McClusky| 47/40.5 |
| 3,736,847 | A | * | 6/1973 | Hickey  | 472/90  |

(Continued)

FOREIGN PATENT DOCUMENTS

DE     2922156 A  * 12/1980

(Continued)

OTHER PUBLICATIONS www.hobbylinc.com printout for search of grass mats, all manufacturers, webpage 1 of 8, Jan. 4, 2008.*

(Continued)

*Primary Examiner*—Cheryl Juska
(74) *Attorney, Agent, or Firm*—Stinson Morrison Hecker LLP

(57) ABSTRACT

A mat for simulating natural terrain for use in an indoors display is the subject of this invention. The mat comprises a sheet of water impervious resinous material, a water base latex emulsion coating applied to the resinous material and a quantity of terrain simulating particles which are adhered to the sheet by the dried coating. The particles are fixed to the sheet by a sealant which is sprayed on the particles after the coating has dried. The particles may comprise flocking, ground foam rubber or rigid solid pieces. The invention also encompasses a method of preparing a simulated natural terrain utilizing the mat as afore described. This method includes outlining desired terrain features, applying water to the outlined area, scraping the substrate to remove particles from the outlined area and then coloring the area. Additional terrain features can be incorporated into the mat by scraping the mat to expose the underlying substrate in the shape of a design in the roadway such as a centerline, crosswalk or the like. Still further terrain simulating features may by utilizing a heat source to raise the temperature of the substrate and then shaping it into hills and valleys.

7 Claims, 3 Drawing Sheets

U.S. PATENT DOCUMENTS

| | | | |
|---|---|---|---|
| 3,740,303 A | 6/1973 | Alderson et al. | |
| 3,908,057 A | 9/1975 | Smith, II | |
| 3,958,054 A * | 5/1976 | McKee et al. | 428/172 |
| 4,044,179 A | 8/1977 | Haas, Jr. | |
| 4,163,813 A * | 8/1979 | Sheets et al. | 427/198 |
| 4,202,922 A * | 5/1980 | Osment | 428/18 |
| 4,278,481 A * | 7/1981 | Osment | 156/61 |
| 4,337,283 A | 6/1982 | Haas, Jr. | |
| 4,859,510 A * | 8/1989 | Rademacher | 428/17 |
| 5,019,431 A * | 5/1991 | Osment et al. | 428/15 |
| 5,209,949 A * | 5/1993 | Osada | 427/198 |
| 5,215,793 A | 6/1993 | Osment et al. | |
| 5,308,075 A | 5/1994 | Theriault | |
| 5,326,267 A * | 7/1994 | Brokaw | 434/151 |
| 5,348,478 A | 9/1994 | Bradshaw | |
| 5,839,657 A * | 11/1998 | Fulton et al. | 238/10 E |
| 5,924,905 A * | 7/1999 | Cyrus et al. | 446/118 |
| 6,089,466 A * | 7/2000 | Fulton et al. | 238/10 B |
| 6,164,555 A * | 12/2000 | Fulton et al. | 238/10 E |
| 6,613,402 B2 * | 9/2003 | Fulton | 428/18 |
| 6,647,893 B1 * | 11/2003 | Fugitt et al. | 104/69 |
| 6,955,580 B2 * | 10/2005 | Fulton | 446/6 |
| 2004/0222564 A1 | 11/2004 | Nishida et al. | |
| 2005/0042394 A1 | 2/2005 | Sawyer et al. | |
| 2005/0046076 A1* | 3/2005 | Forbes | 264/255 |
| 2005/0167037 A1* | 8/2005 | Fulton | 156/230 |

FOREIGN PATENT DOCUMENTS

DE  4324840 A1 *  1/1995

OTHER PUBLICATIONS www.modulor.de/shop printout for Noch grass mat, Jan. 6, 2008.*
Product Insert—Faller 782 Geländematten wiesengrun / Faller Ground Mat, meadow green, Made in Germany.

* cited by examiner

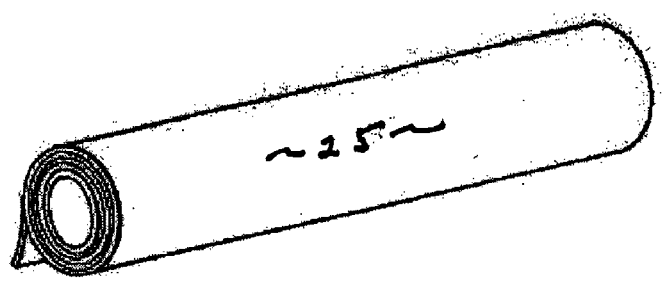
Fig. 4.
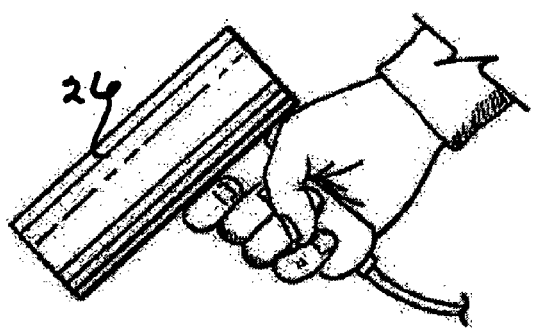
Fig. 5.
Fig. 6.
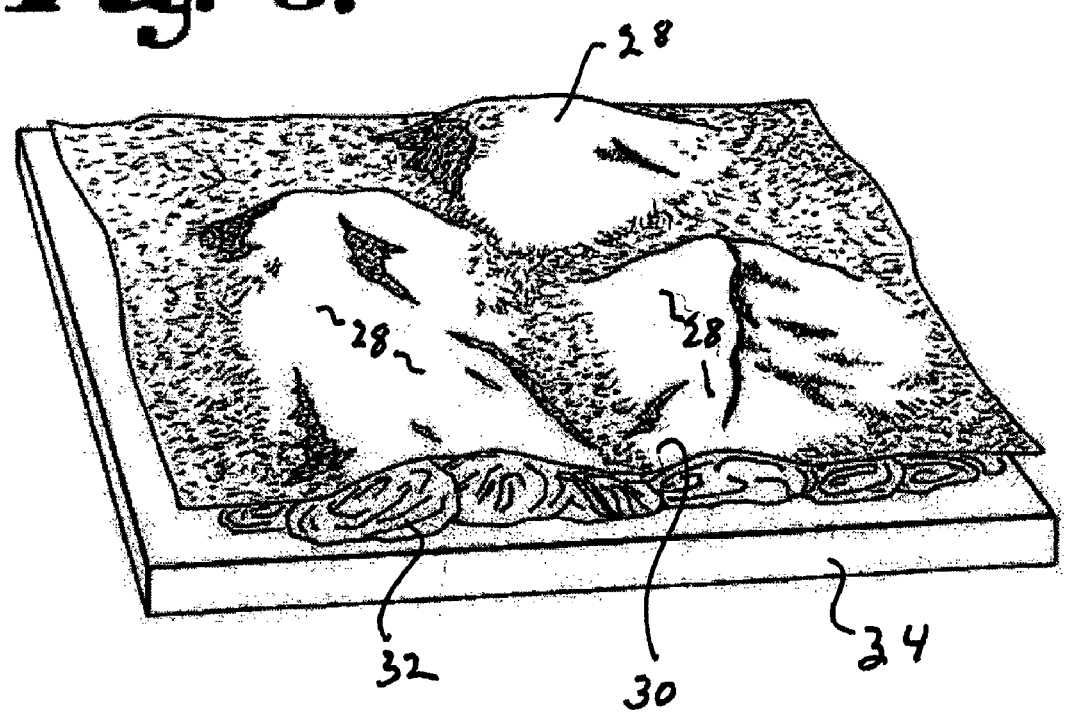

SIMULATED TURF AND METHOD OF MAKING SAME

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

This invention relates generally to artificial landscaping material and, particularly, to a mat for simulating natural terrain in an indoors display which mat can be rolled up for storage and unrolled when ready for use.

Mats which simulate natural terrain are used for many types of indoor displays by both professionals and hobbyists. Popular usages include seasonal decorative displays, game surfaces, battlefield reenactments and model railroading.

Mats for simulating natural terrain according to the prior art have heretofore employed a paper backing to which some type of flocking or other synthetic material is applied by an appropriate adhesive. These mats of the prior art have a tendency to "shed" the turf simulating material especially when they are rolled for storage and then reused. Because of the paper backing these prior art mats have a tendency to tear upon repeated usage. Also, the mats of the prior art cannot easily be formed into different shapes to simulate changing terrain and features such as roads, walks and lakes are not easily or realistically illustrated on the mat. Although some prior mats have utilized flocking which can theoretically be scraped off of the paper backing, the paper backing limits the opportunities for manipulation.

The paper mats of the prior art are also subject to wrinkling upon repeated use and are not recommended for use on carpets or tablecloths because the color will bleed through if the mat becomes wet.

BRIEF SUMMARY OF THE INVENTION

The present invention provides an improved mat for simulating natural terrain for an indoors display, a method of preparing such a mat and a method of constructing the mat utilizing a sheet of water impervious resinous material to which a layer of terrain simulating particles are adhered utilizing a water base latex emulsion. The particles are sprayed with a sealant to further "fix" them to the surface. The shape of the mat can be altered utilizing a heat gun to form hills and valleys. The surface of the mat can also be altered by brushing water over an area and then scraping the particles off of the resinous material. In this manner roads and walkways can easily be formed. Water features can also be illustrated by scraping the particles from the substrate and applying a simulated water coating.

BRIEF DESCRIPTION OF THE DRAWINGS

FIG. 4 is a perspective view illustrating how the mat can be rolled into a compact cylinder for storage;

FIG. 5 illustrates the application of heat to the mat so that it can be formed into different terrain features;

FIG. 6 is a perspective view showing how the heated mat is formed into hills and valleys and supported by crushed newspapers.

DETAILED DESCRIPTION OF PREFERRED EMBODIMENT

Figure 1:
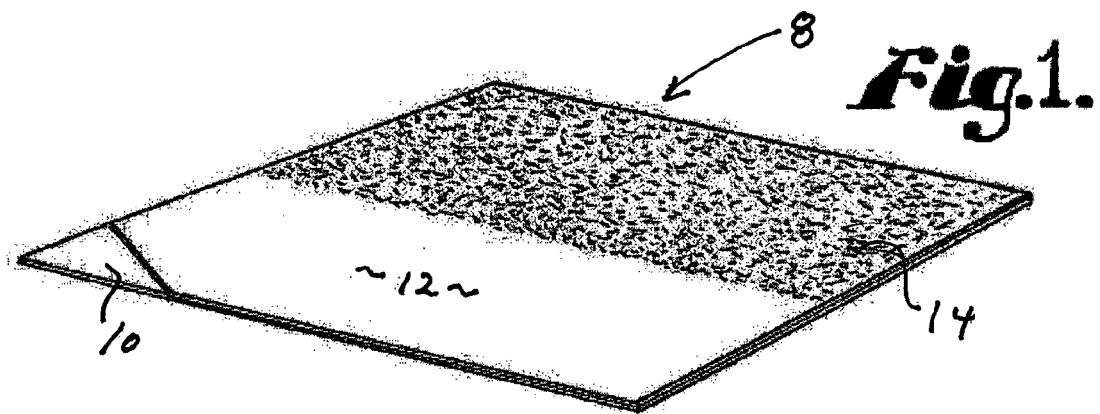
FIG. 1 is a perspective view of a mat for simulating natural terrain according to the present invention illustrating the three basic layers which comprise the mat.

Referring initially to FIG. 1 a mat 8 is formed from a substrate 10 of polyvinyl chloride (PVC) ranging in thickness between 0.1 and 1.5 millimeters and preferably about 1 millimeter is designated by the numeral 10. This sheet 10 is covered with a water soluble coating, preferably a latex emulsion 12 of any desired color, and while the latex emulsion is still wet a layer of ground foam rubber particles 14 are evenly layered over the surface. The foam particles range in size up to 3.0 millimeters and some variation in size is desirable for the most realistic effect. The latex emulsion layer 12 is allowed to dry and when this occurs the foam rubber particles are adhered to PVC layer 10 by the coating. Preferably, after the assembled mat has dried, the foam particles are further "fixed" to the substrate by spraying the particles with a sealer such as a commercially available spray adhesive. Various commercially available water-base and lacquer base adhesives are suitable to serve as the sealant. The sealed mat is then allowed to dry.

Figure 2:
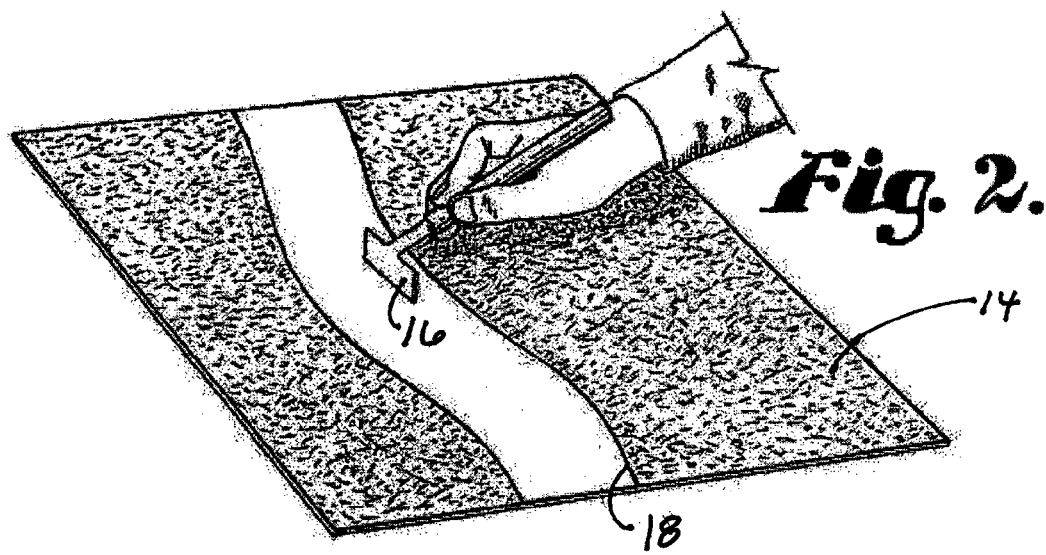
FIG. 2 is a perspective view illustrating how the grass simulating particles are scraped from the water impervious substrate to present a road surface.

While the completed mat as described above may be utilized without further alteration, it is desirable in many instances to add additional terrain features to the mat. Referring to FIG. 2, a road has been outlined utilizing a marking pen or scribe and water has been applied to the area where the road is to be formed. The water is applied with a brush and allowed to stand on the surface for between 10 and 60 seconds. Because PVC layer 10 is water impervious, the time period for the water to stand is not critical. After the water has been on the surface for a time sufficient to loosen the bond between particles 14 and emulsion layer 12, the particles are scraped from the PVC sheet 10 utilizing a scraper 16. This forms a simulated roadway 18. The roadway is then painted a desired color.

Figure 3:
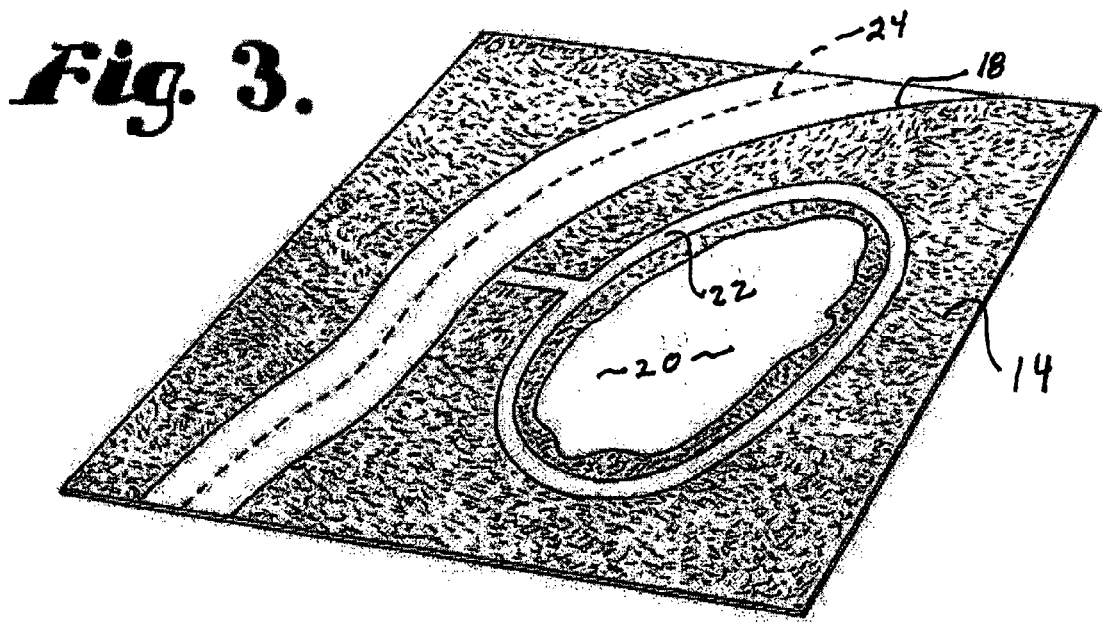
FIG. 3 is another perspective view indicating a completed road which has been formed in the mat, a walkway and a water feature.

Referring additionally to FIG. 3, further landscape details are formed into the mat utilizing the same technique as described for roadway 18. For example, a lake 20 having an irregular shoreline can be constructed along with a walkway 22 surrounding the lake. In the case of lake 20, the substrate will normally be painted to simulate the underwater lake bed. This will entail use of different colors to indicate earth, plant growth and underwater rocks. Substrate 10 will subsequently be painted with a water simulating material of the type commercially available and well known to those skilled in the art. This material is typically a clear acrylic polymer which provides the appearance of a water surface when dry.

Further referring to FIG. 3, it is to be understood that substrate 10 is preferably colored white and roadway 18 is painted black or another dark color. With the present invention it is possible to form a center line 24 (FIG. 3) in roadway 18 by utilizing a scribe to score the emulsion layer 12 and expose the white PVC substrate beneath. Thus, while it has been necessary for illustration purposes to show roadway 18 in white and centerline 24 in a broken black line, it is to be understood that in practice roadway 18 would typically be painted black and centerline 24 would appear white.

FIG. 4 illustrates how the assembled mat can be rolled into a tight cylinder 25 for storage purposes. When the mat is to be reused it is simply unrolled and the surface features previously formed into it remain undisturbed.

Referring to FIGS. 5 and 6, a heat gun 26 is utilized to raise the temperature of the completed mat 8 to a level where it can be easily manipulated and formed into hills and valleys 28 and 30 as illustrated. The completed mat is supported on a solid base 34 and may be adhered to the base if desired. In some applications it will be desirable to place paper wads 32 or similar material underneath the mat before heat is applied so that the heated mat can be formed around the paper wad. In other instances the hills may be formed on a separate sheet of the mat which can then be placed on a flat substrate during use of the mat and removed for storage. As illustrated in FIG. 6, after hills 28 have been formed it may be desirable to scrape some of the foam particles from portions of hills so as to indicate rock formations. The material according to the invention can also be used to form tunnels for model railroad layouts.

Figure 7:
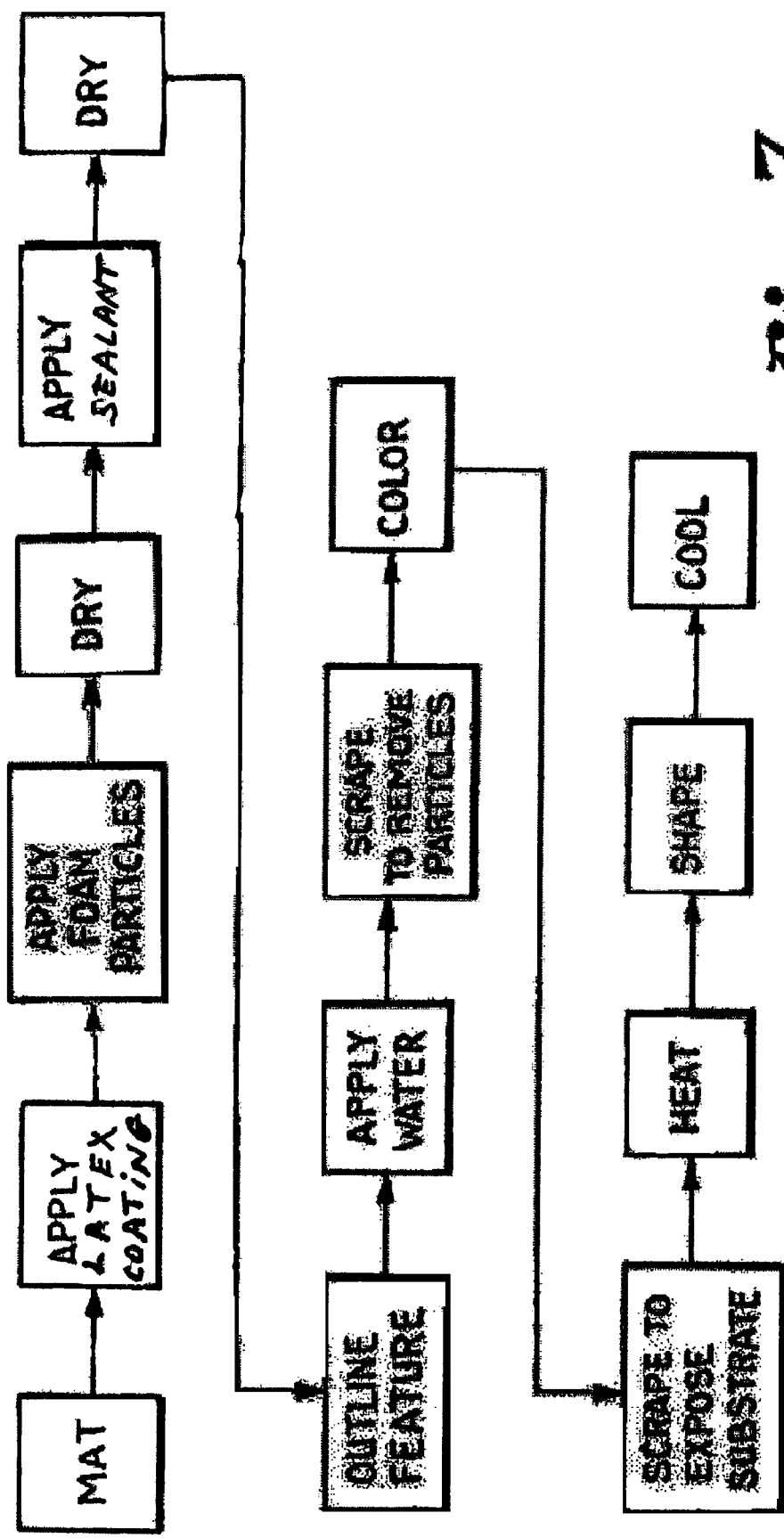
FIG. 7 is a schematic flow diagram showing the steps for carrying out the method of constructing a mat according to the present invention and the method of utilizing the mat.

Referring to FIG. 7 the steps for constructing a mat for use in simulating natural terrain and the steps for preparing a simulated natural terrain from such a mat are illustrated. As previously explained, mat 8 is made from a sheet of PVC to which a latex emulsion coating is applied followed by the application of ground foam particles. The coating is then dried followed by the application of a sealant which is sprayed onto the foam to further "fix it" in place. The mat is then dried before further manipulation. The method of preparing a simulated natural terrain from a mat prepared according to the preceding method comprises the steps of outlining a feature such as a road, walkway or body of water, applying water to the outlined feature with a brush or other applicator, scraping the mat to remove the foam particles and expose the PVC layer after which the PVC layer is painted to provide the desired end color. In the case of a road, an additional step which can be followed to form a center line in the road is to scrape away the painted surface and any remaining emulsion layer to expose the substrate which is the PVC layer so as to present a white center line or other roadway pattern. As a result of the PVC substrate, a scribe may be used to form a cobblestone pattern in the surface with grooves being cut into the PVC by the scribe. A colorant may then be applied over the surface to simulate grouting between the cobblestones. Still another optional step is to heat the mat to a temperature where the PVC is at least partially softened followed by shaping the mat into mountains, valleys and other uneven terrain features. This is followed by cooling the mat so that it will remain in the desired shape.

While polyvinyl chloride is the preferred substrate material for constructing mat 8, other water impervious resinous materials which are capable of being formed into a sheet and rolled into a tight cylinder can also be utilized. Examples of other acceptable materials for the substrate include polyurethanes and polystyrenes.

The water base coating which is applied as a liquid and which serves to adhere the foam particles to the substrate is preferably a vinyl acrylic latex emulsion but may also comprise an emulsion of styrene-butadiene, polyvinyl acetate and other acrylic resins. The distinguishing characteristic is for the coating to be water based and comprise a binder which is disbursable as a water emulsion.

While the application of a sealant in spray form to the foam particles after drying is desirable and reduces the opportunity for "shedding" it is to be understood that this is optional.

While latex foam particles are the preferred material for simulating vegetation, it is to be understood that rigid solid particles could also be applied along with the foam to simulate rocks and other non-vegetarian terrain features. Suitable solid particles include pumice and ground nut hulls. It is also within the scope of the invention to utilize flocking as the terrain simulating particles. In this regard, it is to be understood that the term "particles" as used herein includes fibers, both natural and synthetic, from which flocking is typically made. Flocking can be formed using fibers of different lengths. It may be desirable to applying the flocking utilizing known electrostatic coating technique where the substrate and the flocking "particles" are provided with opposed electrical charges.

The invention claimed is:

1. A method of preparing a simulated natural terrain from a mat comprising a sheet of water impervious resinous material having a latex coating which has been applied to said sheet as a liquid and allowed to dry and a layer of terrain simulating particles which are adhered to said sheet by said latex coating, said method comprising the steps of:
 applying a quantity of water to said layer of particles in an area corresponding to a desired landscape feature;
 scraping said layer of particles off of said sheet in said area;
 coloring said area to present said desired landscape feature;
 heating said sheet;
 shaping the heated sheet to simulate natural terrain; and
 allowing said sheet to cool such that the natural terrain shape is retained by said sheet.

2. A method as set forth in claim 1, wherein said desired landscape feature is a road.

3. A method as set forth in claim 2, wherein said sheet is white and wherein is included the step of scraping said sheet after said coloring step to expose said sheet to present a white pattern in said road.

4. A method as set forth in claim 1, wherein said desired landscape feature is a walkway.

5. A method as set forth in claim 1, wherein said terrain simulating particles comprise flocking.

6. A method as set forth in claim 1, wherein said terrain simulating particles comprise foam rubber.

7. A method as set forth in claim 1, wherein said terrain simulating particles comprise rigid solid pieces.

* * * * *